United States Patent
Park

(10) Patent No.: US 10,520,902 B2
(45) Date of Patent: Dec. 31, 2019

(54) MOBILE ELECTRONIC DEVICE AND SMARTWATCH

(71) Applicant: Chan Bong Park, Gyeonggi-do (KR)

(72) Inventor: Chan Bong Park, Gyeonggi-do (KR)

(73) Assignee: Chan Bong Park, Gyeonggi-do (KR)

( * ) Notice: Subject to any disclaimer, the term of this patent is extended or adjusted under 35 U.S.C. 154(b) by 0 days.

(21) Appl. No.: 15/615,943

(22) Filed: Jun. 7, 2017

(65) Prior Publication Data

US 2017/0357221 A1    Dec. 14, 2017

(30) Foreign Application Priority Data

Jun. 10, 2016  (KR) ........................ 10-2016-0072435

(51) Int. Cl.
| | | |
|---|---|---|
| G04G 21/08 | (2010.01) | |
| G04G 17/04 | (2006.01) | |
| G06F 3/0354 | (2013.01) | |
| G06F 1/16 | (2006.01) | |
| G04G 17/08 | (2006.01) | |
| G04G 21/04 | (2013.01) | |

(52) U.S. Cl.
CPC ........... *G04G 21/08* (2013.01); *G04G 17/045* (2013.01); *G06F 1/163* (2013.01); *G06F 3/03547* (2013.01); *G04G 17/08* (2013.01); *G04G 21/04* (2013.01)

(58) Field of Classification Search
CPC .. G04G 21/08; G04G 17/045; G06F 3/03547; G06F 15/0208
See application file for complete search history.

(56) References Cited

U.S. PATENT DOCUMENTS

| | | | |
|---|---|---|---|
| 2011/0080352 A1* | 4/2011 | Kim | G06F 3/0233 345/173 |
| 2015/0109723 A1 | 4/2015 | Holtzman | |
| 2015/0242120 A1* | 8/2015 | Rodriguez | G06F 3/04886 345/174 |
| 2015/0358043 A1* | 12/2015 | Jeong | H04B 1/385 455/411 |
| 2015/0371516 A1* | 12/2015 | Petersen | G08B 21/02 340/539.12 |
| 2016/0314818 A1* | 10/2016 | Kirk | G11B 27/031 |
| 2017/0038793 A1* | 2/2017 | Kallman | G06F 1/163 |

FOREIGN PATENT DOCUMENTS

| | | |
|---|---|---|
| KR | 1020150007585 | 1/2015 |
| WO | WO2014062497 | 4/2014 |

* cited by examiner

*Primary Examiner* — Kent W Chang
*Assistant Examiner* — Chayce R Bibbee
(74) *Attorney, Agent, or Firm* — Dority & Manning, P.A.

(57) ABSTRACT

A mobile electronic device comprises a housing, a display mounted on the housing and displaying an image, a strap connected to the housing to fix the housing to a part of a user's body and including a touch input portion, the touch input portion comprises a plurality of unit areas, and a controller configured to generate a control command based on the user's touch input in at least one of the plurality of unit areas and an application being executed, and control the mobile electronic device according to the control command.

13 Claims, 17 Drawing Sheets

MOBILE ELECTRONIC DEVICE AND SMARTWATCH

CROSS-REFERENCE TO RELATED APPLICATION

This application claims benefit of priority to Korean Patent Application No. 10-2016-0072435 filed on Jun. 10, 2016 in the Korean Intellectual Property Office, the disclosure of which is incorporated herein by reference in its entirety.

BACKGROUND

1. Field

The present inventive concept relates to a mobile electronic device and to a smartwatch.

2. Description of Related Art

Due to the development of mobile technology using information technology (IT), wearable devices, such as smartwatches, head-mounted display (HMD) devices, and the like, have been continuously released, in addition to devices such as smartphones, laptop computers, tablet personal computers (PCs), and the like. Smartwatches commonly have sizes and weights similar to general wristwatches already in widespread use. In addition, smartwatches have an increasingly wide range of applications, in that smartwatches can be linked to other mobile electronic devices, such as smartphones, or the like, thus providing various functions. In the meantime, since smartwatches are required to be implemented as hardware having a significantly limited volume, a sufficient input space may be difficult to secure therein, and thus, a convenient input function way be difficult to provide to users.

SUMMARY

An aspect of the present inventive concept may provide a relatively convenient input function in a mobile electronic device including hardware having a limited volume, such as a smartwatch, or the like. A touch input portion may be provided on a strap of the smartwatch, thus providing a convenient and efficient input mode to a user, compared with a related art device in which a touchscreen is provided in a display region of the smartwatch.

According to an aspect of the present inventive concept, a mobile electronic device comprises a housing, a display mounted on the housing and displaying an image, a strap connected to the housing to fix the housing to a part of a user's body and including a touch input portion, the touch input portion comprises a plurality of unit areas; and a controller configured to generate a control command based on the user's touch input in at least one of the plurality of unit areas and an application being executed, and control the mobile electronic device according to the control command.

According to an aspect of the present inventive concept, a smartwatch comprises a main body having a watch shape, a strap connected to the main body and fixing the main body to a user's body, a touch input portion provided in a region of the strap and detecting a user's touch input, and a controller configured to control an operation of the main body based on coordinates of the data input from the user's touch input, detected by the touch input portion.

BRIEF DESCRIPTION OF DRAWINGS

The above and other aspects, features and other advantages of the present inventive concept will be more clearly understood from the following detailed description when taken in conjunction with the accompanying drawings, in which.

DETAILED DESCRIPTION

Figure 1:
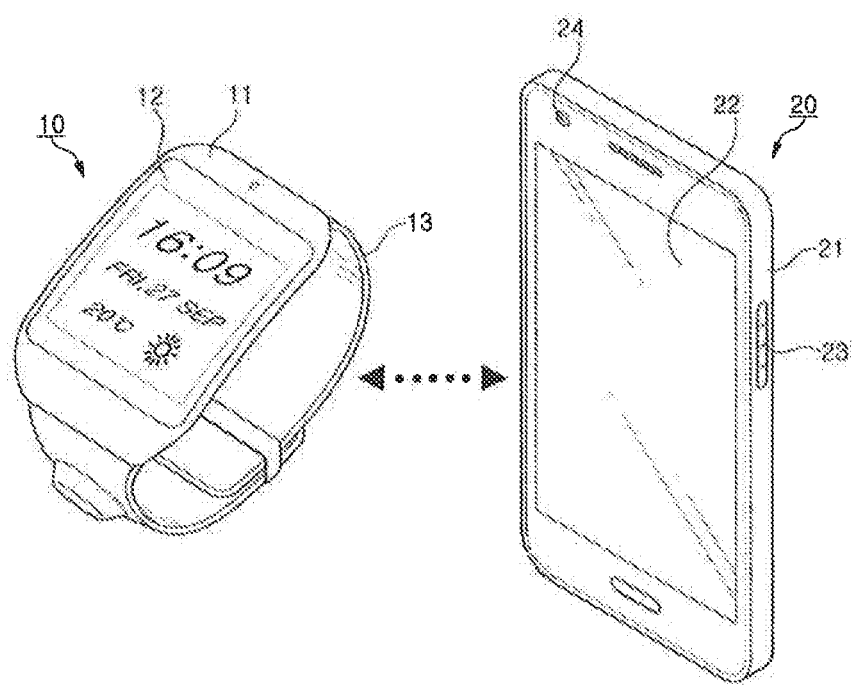
FIG. 1 is a view of an appearance of a mobile electronic device according to an example embodiment of the present inventive concept.

Hereinafter, embodiments of the present inventive concept will be described as follows with reference to the attached drawings.

Throughout the specification, it will be understood that when an element, such as a layer, region or wafer (substrate), is referred to as being "or," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations or one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the example embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device its the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present inventive concept is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

FIG. 1 is a view of an appearance of a mobile electronic device according to an example embodiment of the present inventive concept.

with reference to FIG. 1, a mobile electronic device 10, according to an example embodiment, may be provided as a smartwatch. The mobile electronic device 10 may include a housing 11 having a watch shape, a display 12 mounted on the housing 11 and displaying an image, a strap 13 connected to the housing 11 and fixing the mobile electronic device 10 to a part of a user's body, and the like.

The mobile electronic device 10 may operate by being linked to a different electronic device 20, in order to be able to communicate therewith. An electronic device 20 may be provided as a general electronic device, such as a smart TV, a desktop computer, or the like, as well as a mobile device, such as a smartphone, a tablet PC, a laptop computer, or the like. The electronic device 20 may include a housing 21, a display 22, an input portion 23, a camera module 24, or the like. The user may control an operation of the mobile electronic device 10 through the electronic device 20, or may control an operation of the electronic device 20 through the mobile electronic device 10.

The mobile electronic device 10 may be provided as a wearable device, such as a smartwatch, or the like, which is worn on a portion of the user's body. In an example embodiment, the mobile electronic device 10 may include a sensor collecting body information, such as a pulse rate, a heart rate, body temperature, blood pressure, and the like, in such a manner that the mobile electronic device 10 is in contact with the user's body. The body information collected by the sensor may be managed by the user's healthcare application, or the like, in the mobile electronic device 10 or the electronic device 20 linked to the mobile electronic device 10.

The mobile electronic device 10, due to characteristics thereof, may have a significantly small hardware environment. In detail, in a case in which the mobile electronic device 10 is provided as a wearable device, such as a smart/watch, or the like, the hardware environment thereof may be more restrictive than that of a mobile device, such as a smartphone, a tablet PC, or the like. Therefore, in a case in which an input mode of the mobile electronic device 10 is only provided by a touchscreen attached to the display 12, a stem attached to the housing 11, or the like, the user may be inconvenienced and have difficulty correctly inputting a desired character, selecting from a menu, and the like.

In an example embodiment, the input mode for the user may be provided in a region of the strap 13 having a relatively large area in the mobile electronic device 10. Therefore, the user may be provided with a more convenient and efficient input mode than that in a case in which only a touchscreen mounted on the display 12 is used.

Figure 2:
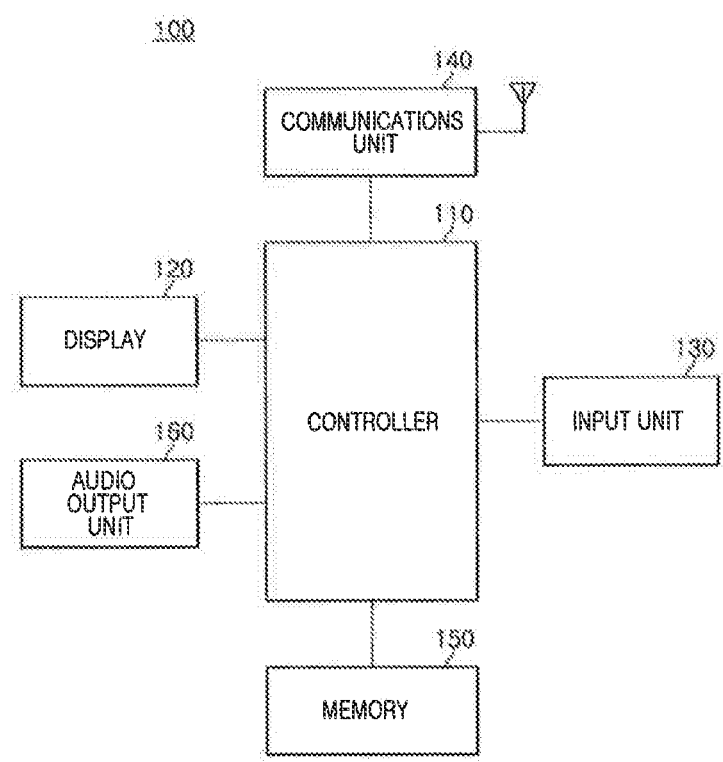
FIG. 2 is a schematic block diagram of a mobile electronic device according to an example embodiment.

FIG. 2 is a schematic block diagram of a mobile electronic device according to an example embodiment.

With reference to FIG. 2, a mobile electronic device 100, according to an example embodiment, may include a controller 110, a display 120, an input unit 130, a communications unit 140, a memory 150, an audio output unit 160, and the like. Respective components included in the mobile electronic device 100 are not limited to those illustrated in FIG. 2, and various other components may be added thereto.

The controller 110 may be provided as a processor for arithmetic processing, and the like, and may control an entirety of an operation of the mobile electronic device 100. In detail, the controller 110 may establish communications with a different external electronic device 20 and generate image data for displaying an image on the display 120. In addition, the controller 110 may generate a control command corresponding to input data detected by the input unit 130 and perform a function corresponding thereto.

The display 120 may be provided as an organic light emitting diode (OLED) display, a liquid crystal display (LCD), a light emitting diode (LED) display, or the like, and may be provided to be integrated with a touchscreen capable of detecting a data input from a user's touch input. The input unit 130 may include at least one mechanical key attached to a housing, in addition to the touchscreen provided to be integrated with the display 120. In detail, according to an example embodiment, the input unit 130 may include a touch input portion provided to be integrated with a strap of a wearable device or detachable from the strap.

Due to characteristics of the mobile electronic device 100, the display 120 may be difficult to be provided as a relatively large display. The display 120 may be typically provided to be about one inch in size. Therefore, a user may have difficulty using a desired input function using the touchscreen provided on the display 120. In detail, in a case in which a desired character is input in an application, such as a text message, a social network service (SNS), an email, a memo, and the like, an efficient input mode may be difficult to be provided only by the touchscreen provided on the display 120.

In an example embodiment, the touch input portion may be provided using a region of the strap having an area greater than that of the display 120. Therefore, the user may conveniently input a desired character in the touch input portion having a relatively large area, thus increasing a number as well as types of applications that may be operated in the mobile electronic device 100.

Figure 3A:
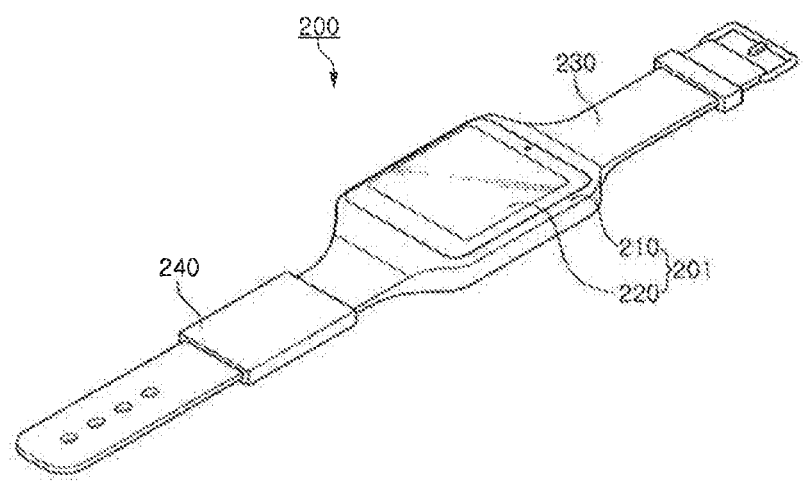
FIGS. 3A, 3B, and 4 are views of an appearance of a mobile electronic device according to an example embodiment.
Figure 3B:
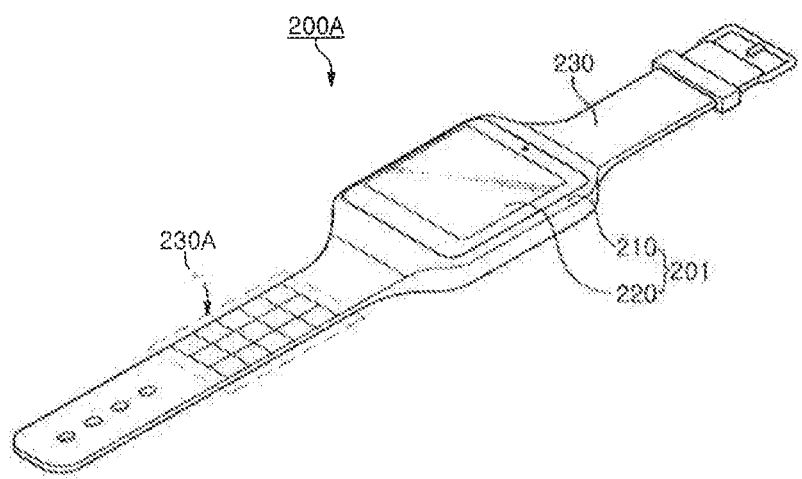
Figure 4:
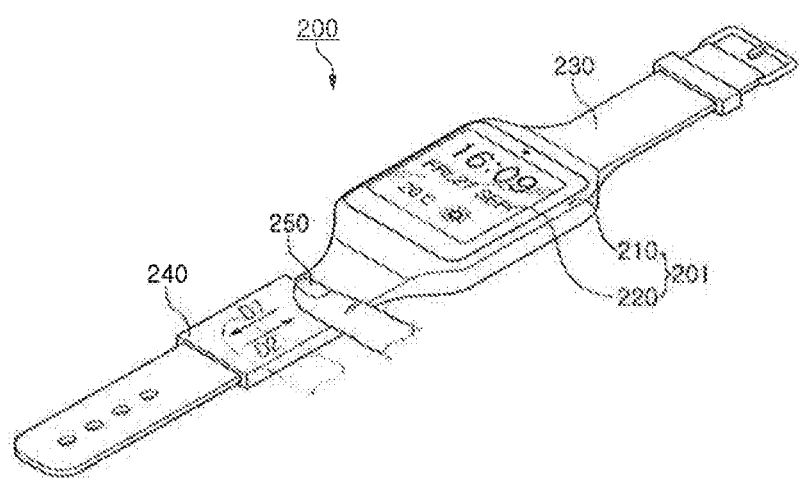

FIGS. 3A, 3B, and 4 are views of an appearance of a mobile electronic device according to an example embodiment.

With reference to FIG. 3A, a mobile electronic device 200, according to an example embodiment, may be provided as a smartwatch. The mobile electronic device 200 may comprise a main body 201 including a housing 210 having a watch shape and a display 220 mounted on the housing 210 to display an image. In addition, the mobile electronic device 200 may include a strap 230, and the like. The strap 230 may be connected to the main body 201 and fix the mobile electronic device 200 to a portion of a user's body. A touch input portion 240 detecting a data input from a user's touch input may be provided in at least a region of the strap 230.

The touch input portion 240 may be provided to be detachable from the strap 230, or fixed to the strap 230. In a case in which the touch input portion 240 is provided to be detachable from the strap 230, the touch input portion 240 may transmit a result of touch interaction detection to the clock portion 201 by wireless communications protocol, such as Bluetooth, infrared communications, ultra-wideband (UWB), Wi-Fi, or the like. In a different example embodiment, the touch input portion 240 may be connected to the clock portion 201 to communicate therewith by a connector provided in the clock portion 201, the strap 230, or the like. In a manner the same as the strap 230, the touch input portion 240 may have a flexibility characteristic, due to the characteristics of the strap 230 fixed to the user's body.

The touch input portion 240 may provide various input modes, such as character input, selection of an application executable in the mobile electronic device 200, enlargement and reduction of an image, time setting, and the like. In order to respond to various input modes, the touch input portion 240 may include a plurality of unit areas, and different input functions may be assigned to a plurality of unit areas, according to an application being executed in the mobile electronic device 200. An input function assigned to the plurality of unit areas, according to an application being executed in the mobile electronic device 200, may be changed by the mobile electronic device 200 or a different electronic device 20 linked to the mobile electronic device 200, according to need.

The touch input portion 240 may not only provide an input mode, such as character input, and the like, to a user, but also be used for data input, such as a sleep mode switch of the mobile electronic device 200. With reference to FIG. 4, the user may touch-slide in a first direction D1 or a second direction D2 on an upper surface of the touch input portion 240 using a finger 250, in order to enter or awaken the mobile electronic device 200 from a sleep mode. In an example embodiment, in a case in which the user touch-slides the upper surface of the touch input portion 240 in the first direction D1, the mobile electronic device 200 may be awoken from the sleep mode. On the other hand, in a case in which the upper surface or the touch input portion 240 is touch-slid in the second direction D2, the mobile electronic device 200 may enter the sleep mode. Whether to enter the sleep mode of the mobile electronic device 200 may be selected using the touch input portion 240, thus efficiently managing use time of the mobile electronic device 200 within a limited amount of battery capacity.

In a case in which the user's touch inputs at least one of the plurality of unit areas included in the touch input portion 240, unique information with which a unit area touched by the user may be discerned may be transmitted to a controller of the mobile electronic device 200. The unique information may be provided as a position, coordinates, or the like, of unit areas. The controller may generate a control command, according to the unique information received from the touch input portion 240. In addition, the controller may control an operation of the mobile electronic device 200, and the like, based on the control command. Hereinafter, example embodiments of the present inventive concept will be described in more detail with reference to different drawings.

With reference to FIG. 3B, a mobile electronic device 200A, according to an example embodiment, may be provided as a touch input portion 230A in which a region of the strap 230 may detect a data input from a user's touch input. In other words, as illustrated in FIG. 3B, the touch input portion 230A may be provided in such a manner that a conductive pattern detecting the data input from a user's touch input, or the like, is included in a region of the strap 230. The touch input portion 230A may include the plurality of unit areas arrayed in a plurality of rows and columns. The operation to be performed in the mobile electronic device 200 may be determined, according to an area in which the data input from a user's touch input occurs, among the plurality of unit areas. The touch input portion 230A may be provided on at least one of opposing sides of the strap 230, based on the main body 201. An operation of the touch input portion 230A illustrated in FIG. 3B may be similar to that of the touch input portion 240 illustrated in FIG. 3A.

FIGS. 5A to 7 are views illustrating a method of character input in a mobile electronic device according to an example embodiment. Hereinafter, for the sake of convenience, example embodiments of the present inventive concept will be described with reference to a mobile electronic device 200 illustrated in FIG. 4.

Figure 5A:
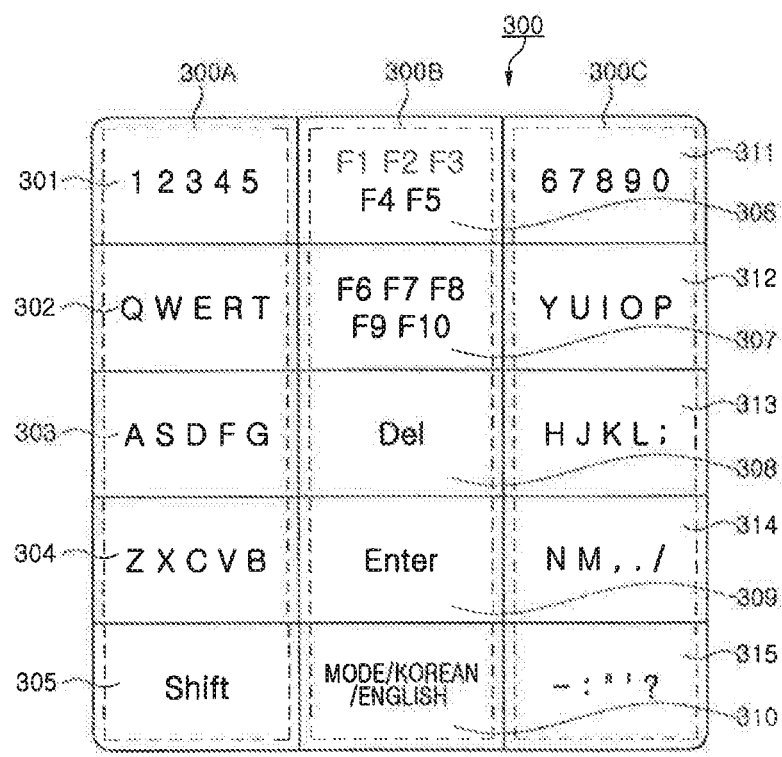
FIGS. 5A to 7 are views illustrating a character input function of a mobile electronic device according to an example embodiment.
Figure 5B:
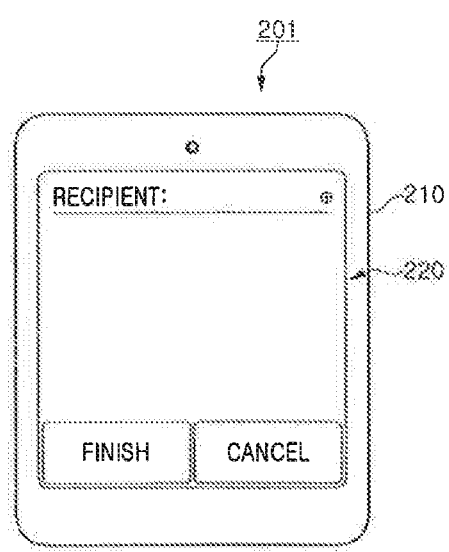

First, with reference to FIG. 5A, a touch input portion 240 may provide a character input function 300, in response to an application executed in the mobile electronic device 200. In an example embodiment, the touch input portion 240 may provide the character input function 300, while an application such as a test transmission application, an email application, a memo application, or the like, as illustrated in FIG. 5B, is being executed.

In an example embodiment, while the character input function 300 is being performed, the touch input portion 240 may provide a plurality of unit areas 301 to 315, and the plurality of unit areas 301 to 315 may be disposed in a plurality of rows and columns. With reference to FIG. 5A, the plurality of unit areas 301 to 315 may be grouped into a first group 300A, a second group 300B, and a third group 300C and managed. A plurality of character groups may be assigned to at least a portion of the plurality of unit areas 301 to 315.

In a case in which a user selects one among the plurality of unit areas 301 to 315, a plurality of characters included in character groups assigned to unit areas 301 to 315 selected by the user may be reassigned to correspond to a portion of unit areas on a one-to-one basis. In this case, a portion of the unit areas to which the plurality of characters are reassigned may be provided as areas included in groups 300A, 300B, and 300C including the unit areas 301 to 315 initially selected by the user.

Figure 6A:
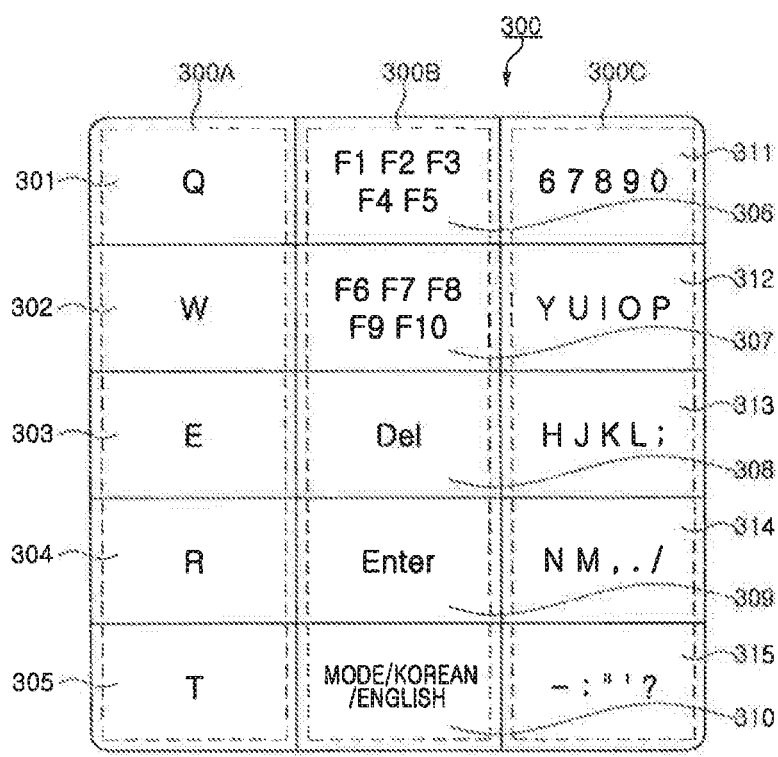

In detail, in a case in which the user inputs the letter Q, the user may select a second unit area 302 to which a character group [QWERTY] is assigned. In a case in which the second unit area 302 is selected, alphabetic characters of the character group [QWERTY] assigned to the second unit area 302 may correspond to the unit areas 301 to 305 included in the first group 300A including the second unit area 302 on a one-to-one basis, in a manner the same as the example embodiment illustrated in FIG. 6A. With reference to FIG. 6A, characters Q, W, E, R and T may be assigned to a first unit area 301, a second unit area 302, a third unit area 303, a fourth unit area 304, and a fifth unit area 305, included in the first group 300A, respectively.

Figure 6B:
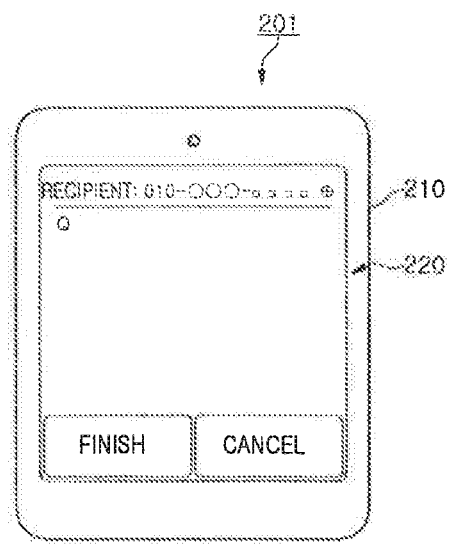

As illustrated in FIGS. 6A and 6B, the user may input the letter Q by touching the first unit area 301 of the first group 300A. Using to the method described above, the user may quickly and conveniently input a desired letter, number, special character, function key, and the like, with only two touch operations.

In the meantime, a portion of functions expected to be frequently selected by the user in the character input function 300 may be assigned to at least a portion of the plurality of unit areas 301 to 315, on a one-to-one basis. With reference to FIGS. 5A and 6A, and the like, a delete command Del, a line break command Enter, a capital switching command Shift, and a Korean-English switching command may be assigned to the unit areas 305, 308, 309, and 310, respectively. A function expected to be frequently selected by the user may be varied, according to the user's setting.

Figure 7:
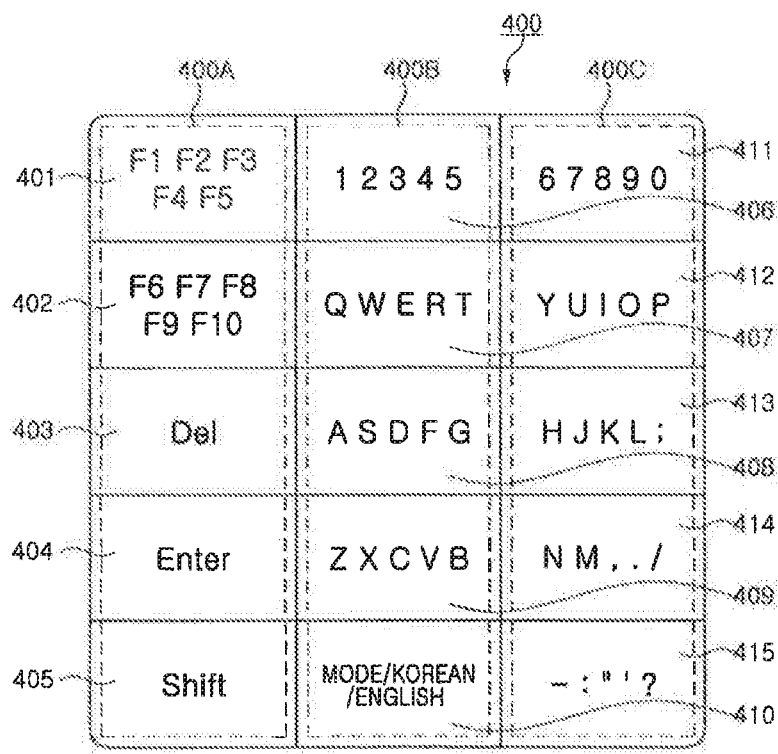

FIG. 7 is a view illustrating a method of character input in a mobile electronic device according to an example embodiment.

With reference to FIG. 7, a touch input portion 240 may provide a plurality of unit areas 401 to 415 when a character input function 400 is performed, and the plurality of unit areas 401 to 415 may be divided into three groups 400A, 400B, and 400C. The three groups 400A, 400B, and 400C may be defined as respective independent columns.

Compared to the character input function 300, illustrated in FIG. 5A, in the character input function 400, illustrated in FIG. 7, it can be confirmed that an entirety of a character group including an alphabetic or numerical character is assigned to unit areas 406 to 415 included in a second group 400B and a third group 400C. Therefore, a right-handed user wearing a mobile electronic device 200 on a left wrist may input a character relatively conveniently. On the other hand, a left-handed user may input a character relatively conveniently in such a manner that a character group including an alphanumeric or numerical character is only assigned to the unit areas 401 to 410 included in a first group 400A and the second group 400B.

Figure 8:
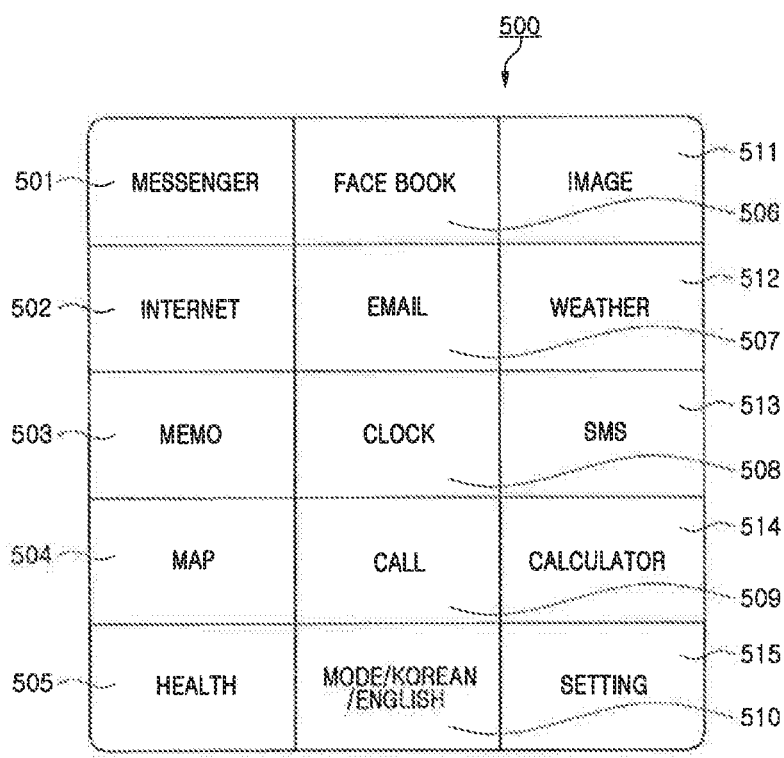
FIG. 8 is a view illustrating an application selection function of a mobile electronic device according to an example embodiment.

FIG. 8 is a view illustrating an application selection function of a mobile electronic device according to an example embodiment.

A mobile electronic device 200 may execute various applications. In an example embodiment, the mobile electronic device 200 may execute various applications, such as an image display application, a health care application, a map application, a weather forecasting application, an Internet browser application, and the like, as well as an application, such as a messenger application, an email application, a memo application, a social network service (SNS) application, a phone call application, a short message service (SMS) application, and the like, requiring the input of a character or a number. A touch input portion 240, according to an example embodiment, may provide an application selection function 500 to select one of various applications.

with reference to FIG. 8, in the application selection function 500, the touch input portion 240 may provide a plurality of unit areas 501 to 515. In the application selection function 500, the plurality of unit areas 501 to 515 are not required to be grouped and managed, in a manner different from character input functions 300 and 400. In a case in which one of the plurality of unit areas 501 to 515 is selected, an application, corresponding to the unit areas 501 to 515 may be executed in the mobile electronic device 200.

Figure 9A:
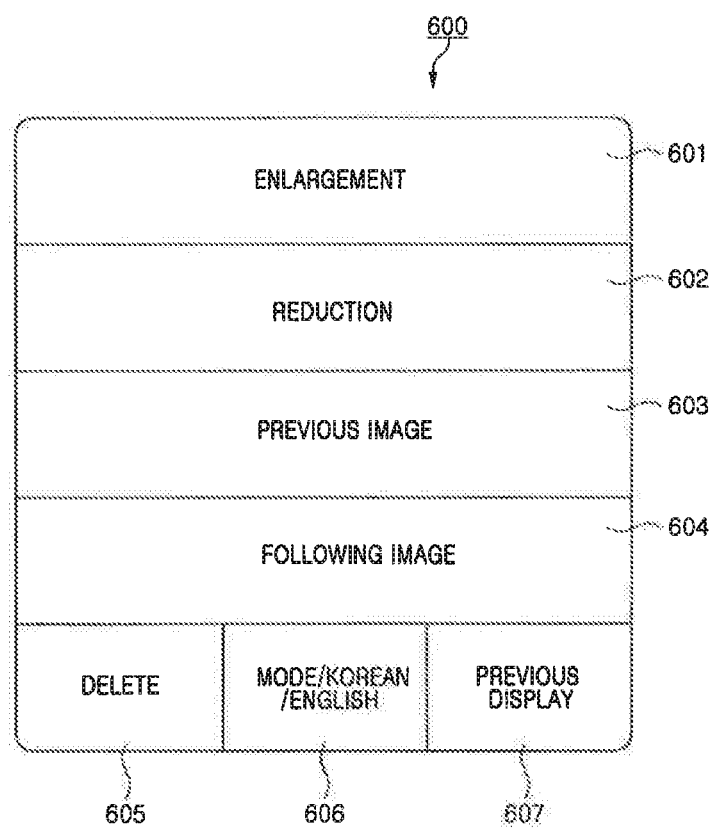
FIGS. 9A and 9B are views illustrating an operation of a mobile electronic device according to an example embodiment.
Figure 9B:
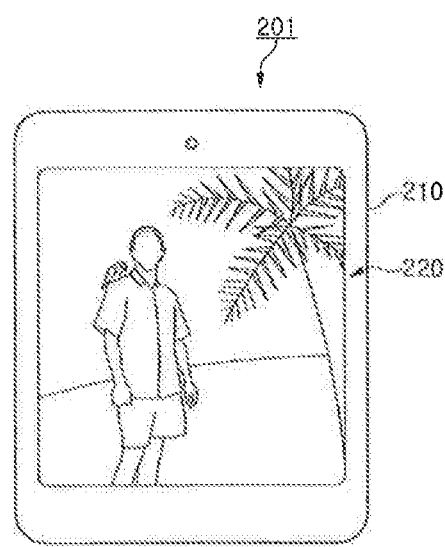

FIGS. 9A and 9B are views illustrating an operation of a mobile electronic device according to an example embodiment.

With reference to FIGS. 9A and 9B, in a case in which an application displaying an image is executed in the mobile electronic device 200, the touch input portion 240 may provide an image control function 600. According to an example embodiment, a plurality of unit areas 601 to 607 provided in an image control function 600 may be implemented in a form different from those of character input functions 300 and 400, as well as an application selection function 500. With reference to FIG. 9A, unit areas 601 to 604 generating a command for zooming in or out on an image or moving to a previous or following image may have an area greater than that of different unit areas 605 to 607. The user may touch one of the plurality of unit areas 601 to 607, in order to zoom in or out on an image or display a previous or following image on a display 220.

Figure 10A:
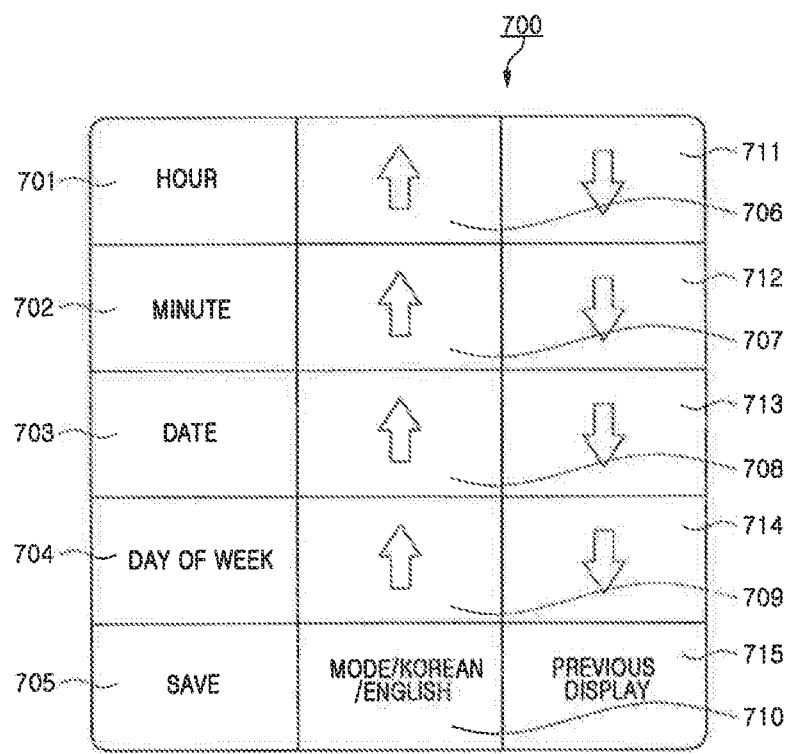
FIGS. 10A and 10B are views illustrating an operation of a mobile electronic device according to an example embodiment.
Figure 10B:
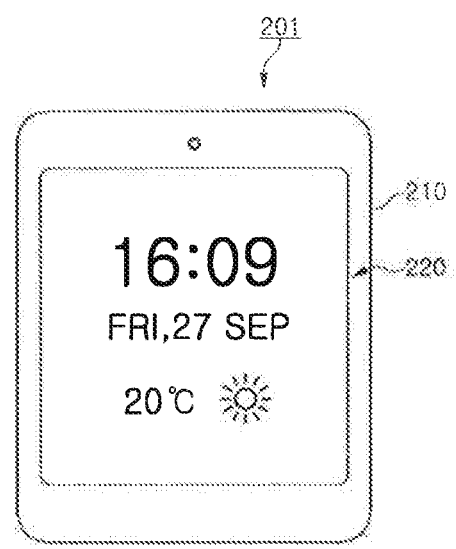

FIGS. 10A and 10B are views illustrating an operation of a mobile electronic device according to an example embodiment.

In a case in which a mobile electronic device 200 is provided as a smartwatch that is a wearable device, a display 220 may display a time, a date, and the like, on a main screen. In this case, the time displayed on the display 220 may be received from an external server, or the like, and automatically set, but may be changed by a user. The user may change the time, the date, and the like, in a clock menu or a setting menu of the mobile electronic device 200. In this case, the touch input portion 240 may provide a time setting function 700.

With reference to FIG. 10A, in a case in which a first unit area 701, a second unit area 702, a third unit area 703, and a fourth unit area 704, disposed in a first column, are touched, no change may occur. In other words, the first unit area 701, the second unit area 702, the third unit area 703, and the fourth unit area 704 may only be provided for the purpose of displaying an item to be changed by the user.

The user may select one of unit areas 706 to 709 and 711 to 714, marked by an arrow, and may change an hour, a minute, a date, a day of week, and the like. In a case in which unit areas 706 to 709 marked with an upward arrow are selected, each item may be shuffled forwards, while in a case in which unit areas 711 to 714 marked with a downward arrow are selected, each item may be shuffled backwards. A changed time, date, and the like, may be saved in such a manner that a unit area 705 marked "[save]" is selected, while a previous screen of a time change mode 700 may appear in such a manner that a unit area 713 marked "[previous screen]" is selected.

Figure 11A:
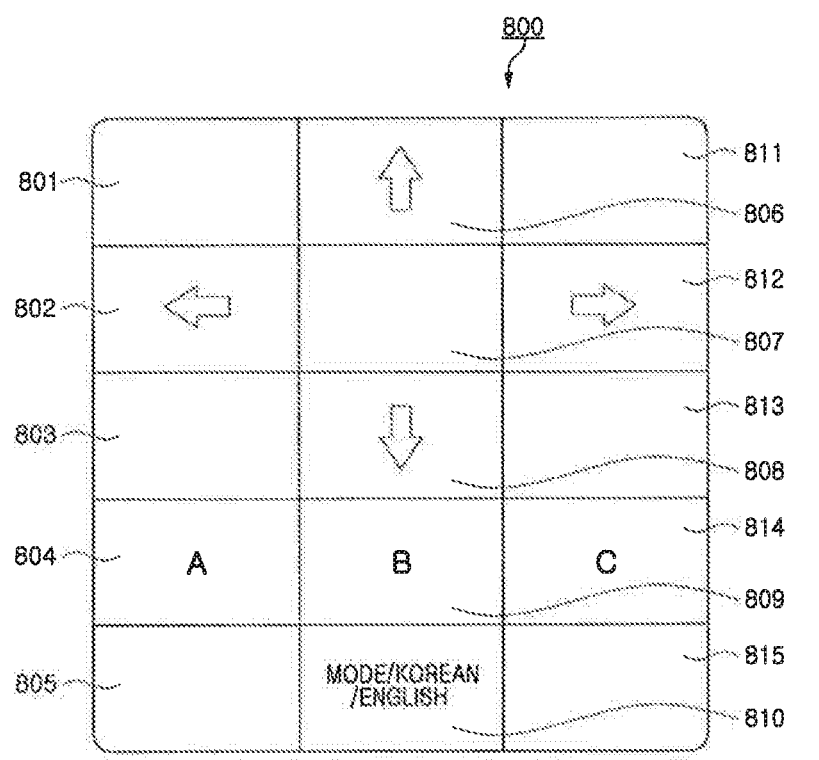
FIGS. 11A and 11B are views illustrating an operation of a mobile electronic device according to an example embodiment of the present inventive concept.
Figure 11B:
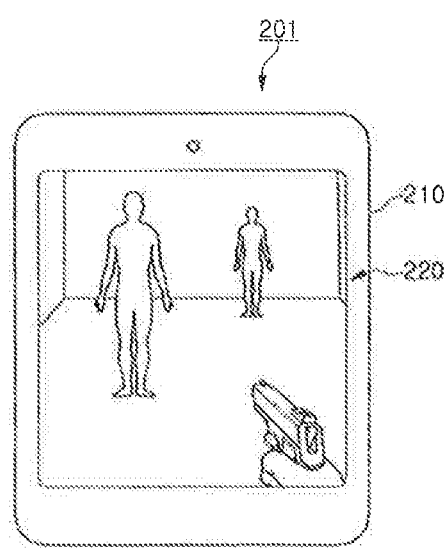

FIGS. 11A and 11B are views illustrating an operation of a mobile electronic device according to an example embodiment of the present inventive concept.

With reference to 11A and 11B, a mobile electronic device 200, according to an example embodiment, may provide a game function. In a case in which the mobile electronic device 200 is provided as a wearable device, a game function may be difficult to perform smoothly using a touchscreen method in which a user directly touches a screen, due to characteristics of a wearable device having a relatively small screen. In an example embodiment, a touch input portion 240 may provide a game controller function 800, thus providing a relatively convenient game environment in the wearable device having a relatively small screen.

With reference to FIG. 11A, in the game controller function 800, at least a portion of unit areas 802, 806, 808, and 812 may be provided as an input area for movement in a game. At least a portion of different unit areas 804, 809, and 814 may be provided as an area for selecting a specific operation in the game. With reference to FIG. 11B, a case in which a shooting game is played in the mobile electronic device 200 is taken as an example, but various other games may be played. In addition, depending on a type of a game to be played in the mobile electronic device 200, a function assigned to respective unit areas 801 to 815 in the game controller function 800, a number of unit areas 801 to 815 in which a specific function in a game is, in actuality, selected, and the like, may be varied.

According to the example embodiment described above, the touch input portion 240 may provide an appropriate input mode based on various applications executable in the mobile electronic device 200. Different input functions may be assigned to a plurality of unit areas included in the touch input portion 240, according to an application being executed in the mobile electronic device 200.

In the meantime, a single function fixed regardless of an application being executed in the mobile electronic device 200 may be assigned to at least one of the plurality of unit areas. With reference to FIGS. 5A, 6A, 7, 8, 9A, 10A, and 11A, a single input area 310, 410, 510, 606, or 710, disposed in the same position, may be fixed to have a [Mode/Korean/English] portion, regardless of a type of an application. In other words, even in the case that the mobile electronic device 200 is executing an application, the user may touch the [Mode/Korean/English] portion a certain number of times or for a predetermined period of time, in order to perform an application selection function 500 quickly, as illustrated in FIG. 8. Therefore, a relatively convenient and efficient input mode may be provided to the user.

As set forth above, according to example embodiments of the present inventive concept, a mobile electronic device and a smartwatch may include a touch input portion on a strap and provide an input mode to a user. The touch input portion may be divided into a plurality of unit areas. Each of the plurality of unit areas may generate different control commands according to an application executed in a mobile electronic device or a smartwatch. Therefore, a convenient and efficient input mode may be provided to the user in a limited hardware space.

While example embodiments have been shown and described above, it will be apparent to those skilled in the art that modifications and variations could be made without departing from the scope of the present inventive concept as defined by the appended claims.

What is claimed is:

1. A mobile electronic device, comprising:
a housing;
a display mounted on the housing and displaying an image;
a strap connected to the housing to fix the housing to a part of a user's body and including a first side of the strap attached to one side of the housing, a second side of the strap attached to another side of the housing, and a touch input portion on only one of the first side of the strap and the second side of the strap, the touch input portion comprises a plurality of unit areas; and
a controller configured to generate a control command based on the user's touch input in at least one of the plurality of unit areas and an application being executed, and control the mobile electronic device according to the control command;
wherein, in a case in which the application includes a character input function, the controller assigns character groups to at least a portion of the plurality of unit areas to set the at least a portion of the plurality of unit areas as a character input area, each of the character groups includes a plurality of different characters,
wherein the controller reassigns a plurality of characters included in a character group assigned to a character input area selected by the user's touch input, to a plurality of unit areas arranged in a length direction of the strap and comprising a character input area selected by the user's touch input, among the plurality of unit areas, respectively; and
wherein a number of the plurality of characters is equal to a number of the plurality of unit areas arranged in a length direction of the strap.

2. The mobile electronic device of claim 1, wherein the plurality of unit areas are arranged in a plurality of rows and columns.

3. The mobile electronic device of claim 1, wherein the controller generates the control command based on coordinates of the plurality of unit areas in which the user's touch input occurs and the application being executed.

4. The mobile electronic device of claim 1, wherein the controller inputs a character assigned to an area selected by the user, among the plurality of unit areas, to the application being executed.

5. The mobile electronic device of claim 1, wherein the controller generates a single control command for at least one of the plurality of unit areas, independently of the application being executed.

6. The mobile electronic device of claim 5, wherein the single control command is provided as a control command to select one application among applications executable by the controller.

7. The mobile electronic device of claim 1, wherein the touch input portion is provided to be detachable from the only one of the first side of the strap and the second side of the strap.

8. The mobile electronic device of claim 1, wherein the controller provides at least a portion of the plurality of unit areas adjacent to each other as a single unit area, based on the application being executed.

9. A smartwatch, comprising:
a main body having a watch shape;
a strap connected to the main body and fixing the main body to a user's body and including a first side of the strap attached to one side of the main body, and a second side of the strap attached to another side of the main body;
a touch input portion comprising a plurality of unit areas and provided in a region of only one of the first side of the strap and the second side of the strap and detecting a user's touch input; and
a controller configured to control an operation of the main body based on coordinates of the data input from the user's touch input, detected by the touch input portion;
wherein, in a case in which an application includes a character input function, the controller assigns character groups to at least a portion of the plurality of unit areas to set the at least a portion of the plurality of unit areas as a character input area, each of the character groups includes a plurality of different characters,
wherein the controller reassigns a plurality of characters included in a character group assigned to a character input area selected by the user's touch input, to a plurality of unit areas arranged in a length direction of the strap and comprising a character input area selected by the user's touch input, among the plurality of unit areas, respectively, and wherein a number of the plurality of characters is equal to a number of the plurality of unit areas arranged in a length direction of the strap.

10. The smartwatch of claim 9, wherein the controller is disposed in the main body and executes a plurality of applications.

11. The smartwatch of claim 10, wherein the controller controls the operation of the main body based on the application being executed and the coordinates of the data input from the user's touch input.

12. The smartwatch of claim 9, wherein the touch input portion comprises a plurality of unit areas, and
the controller determines that at least one of the plurality of unit areas has an area greater than an area of another one of the plurality of unit areas.

13. The smartwatch of claim 9, wherein the touch input portion is provided to be detachable from the strap.

\* \* \* \* \*